Jan. 10, 1933.  J. W. MALMQUIST  1,893,750
AUTOMOBILE TRUNK
Filed May 18, 1929   5 Sheets-Sheet 1
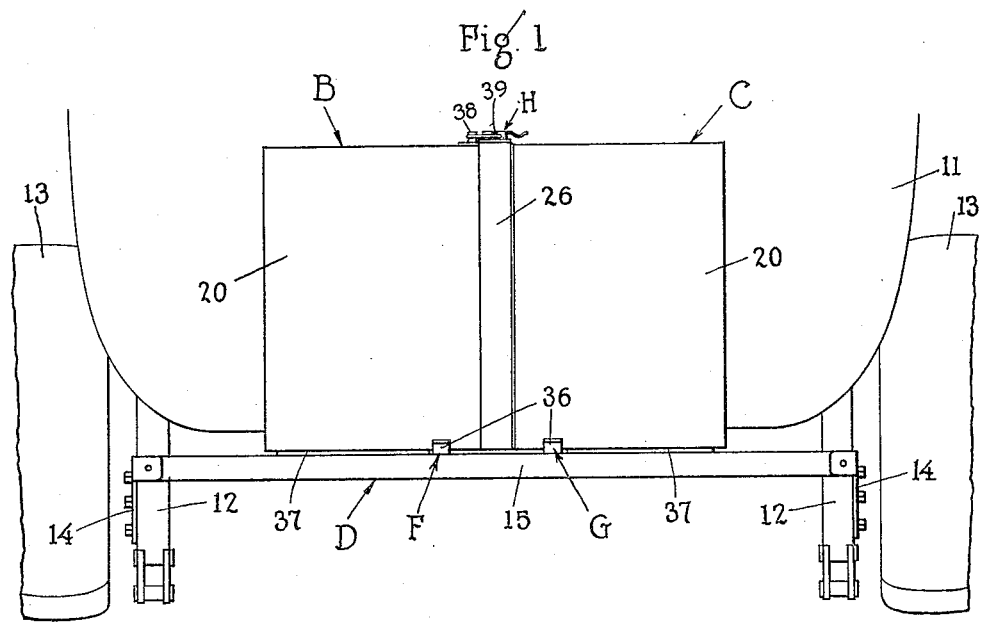
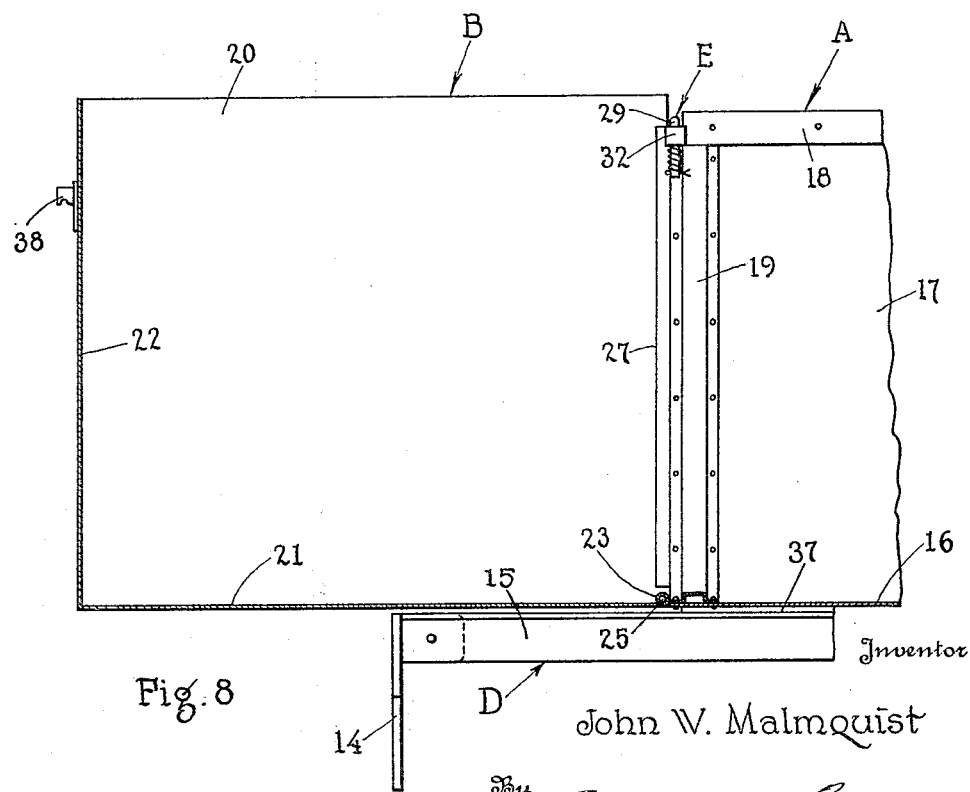
Inventor
John V. Malmquist
By Caswell & Lagard
Attorneys

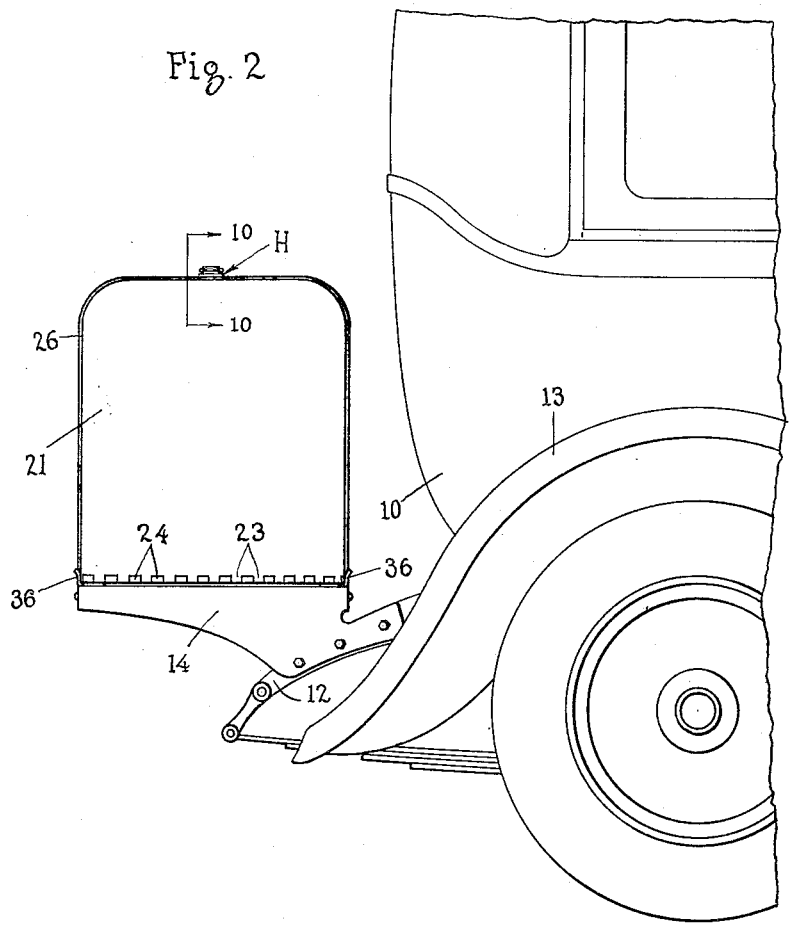
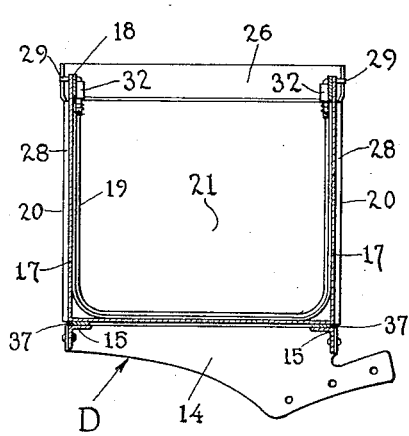

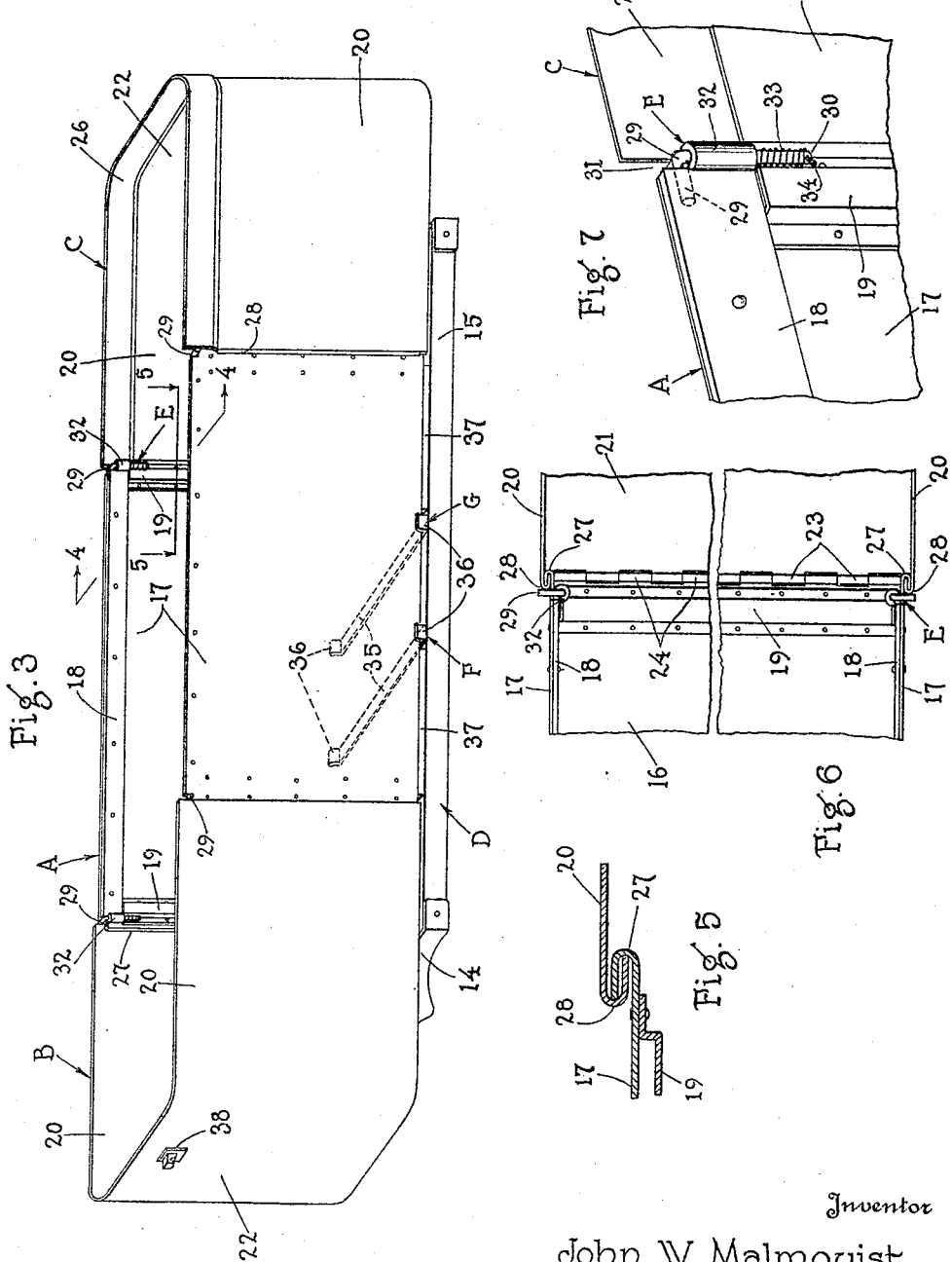

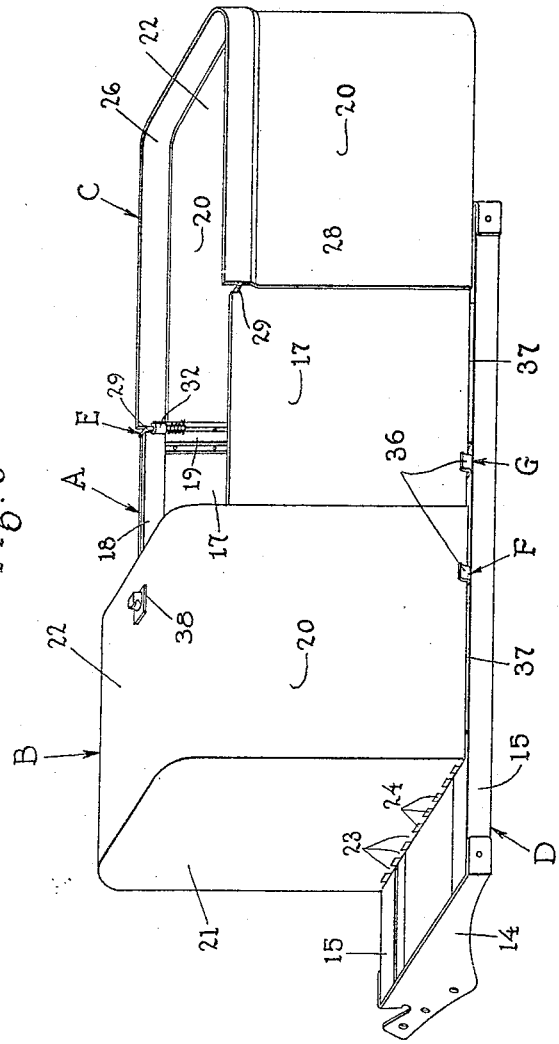
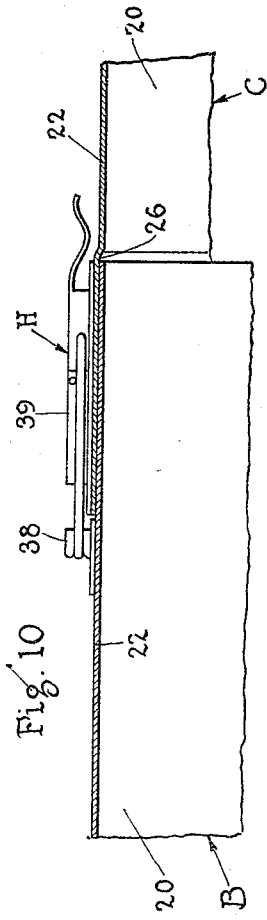

Jan. 10, 1933.   J. W. MALMQUIST   1,893,750
AUTOMOBILE TRUNK
Filed May 18, 1929   5 Sheets-Sheet 5

Inventor
John W. Malmquist

By Caswell & Lagaard
Attorneys

Patented Jan. 10, 1933

1,893,750

UNITED STATES PATENT OFFICE

JOHN W. MALMQUIST, OF ABERDEEN, SOUTH DAKOTA

AUTOMOBILE TRUNK

Application filed May 13, 1929. Serial No. 364,066.

My invention relates to improvements in automobile trunks, an object thereof being to provide a simple, durable, sightly and inexpensive trunk, which may be quickly and easily expanded in available and otherwise unoccupied space to provide a commodious luggage carrier which does not objectionably detract from the appearance of the automobile.

Another object of the invention is to provide an improved trunk for automobiles, as above noted, the same, in either form, presenting a sturdy construction for the accommodation of loads and, in expanded form, presenting a relatively large and unobstructed luggage space.

A further object of the invention is to provide a convertible trunk adapted to be carried at the rear of an automobile body and which may be expanded transversely thereof to form a luggage carrier of relatively great capacity without subjecting the automobile structure to additional strains, as would occur if the trunk were expanded rearwardly of the automobile and the leverage of the load thereby increased.

Another object of the invention is to provide a rear trunk for an automobile adapted to be readily converted in form, one form constituting a trunk-like structure and another form constituting a relatively large luggage carrier open at the top thereof, the device permitting of the change from one form to the other without interference with or from the spare tire in its customary location at the rear of the automobile.

An additional object is to provide a convertible trunk for automobiles capable of endwise enlargement to afford increased carrying capacity.

More specifically it is my object to provide a trunk having a body section adapted to be secured to the rear portion of an automobile transversely thereof and having wing sections hinged to said body section, the body section consisting of a bottom and sides, the wing sections, in folded position enveloping the body section in marginally overlapping relation, providing a closure for the ends and top thereof and, in extended position, providing terminal extensions, each having sides and a bottom in continuation of the sides and bottom of the body section and each having a portion providing an end for the expanded structure.

Other objects are to provide, in the combination, simple and effective means for bracing the hinged wing sections with respect to the body section in the unfolded positions of the former; to provide simple and effective means for locking the wing sections in their unfolded positions, and to provide means for guiding the sides of the wing sections as said sections are folded to direct the meeting margins of said sides into overlapping relation and to cause them to hug the sides of the body section.

With the foregoing and other objects, in view, which will appear in the following description, the invention resides in the novel combination and arrangement of parts and in the details of construction hereinafter described and claimed.

In the drawings:

Fig. 1 is a rear elevational view of a trunk embodying my invention, the same being shown as applied to an automobile fragmentarily illustrated in rear elevation;

Fig. 2 is a view similar to Fig. 1, the trunk and automobile being illustrated in side elevation;

Fig. 3 is a perspective view in detail of the device in expanded form and of a rack for supporting the trunk at the rear of an automobile frame;

Fig. 4 is a transverse sectional view of the trunk taken as on the line 4—4 of Fig. 3;

Fig. 5 is a sectional view in detail taken as on the line 5—5 of Fig. 3 and illustrating the interlocking marginal hooks which are formed on the sides of the body and wing sections of the trunk;

Fig. 6 is a fragmentary plan view of adjoining portions of the body section and one of the wing sections as they appear when the trunk is expanded;

Fig. 7 is a detail elevational perspective view, illustrating the construction employed for locking the wing sections against folding movement with respect to the body section;

Fig. 8 is a vertical sectional view in detail showing particularly the hinged connection between the body section of the trunk and one of the wing sections thereof;

Fig. 9 is a perspective view of the device showing one of the wing sections folded and the other extended;

Fig. 10 is a sectional view in detail taken as on the line 10—10 of Fig. 2;

Figure 11:
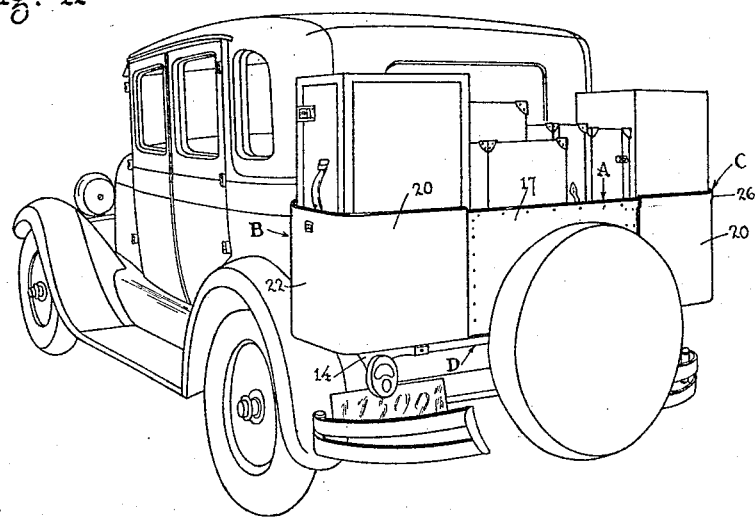
Fig. 11 is a perspective view of an automobile equipped with a device embodying my invention, said device being shown as expanded and loaded with numerous cases and trunks.

In the drawings, I have illustrated a trunk embodying my invention and from the various views, wherein similar reference characters are employed to designate similar parts, it will be seen that my improved trunk structure comprises, generally, an intermediate or body section A and wing sections B, C at the ends of the body section. In Figs. 1 and 2, the trunk is shown in connection with an automobile, which is illustrated fragmentarily, a portion of the body being portrayed as at 11, the frame members as at 12 and the rear fenders as at 13. The trunk is supported on a suitable rack D and as illustrated, comprises the usual end brackets 14 and cross-rails 15, the former being riveted or otherwise suitably secured to the frame members 12 of the automobile and the latter being secured at their ends to said brackets 14. In the present instance as is commonly the case, the rack D traverses the automobile in position at the rear of the body 11 and forwardly of the position usually occupied by the ordinary rear spare tire carrier (not shown).

Figure 12:
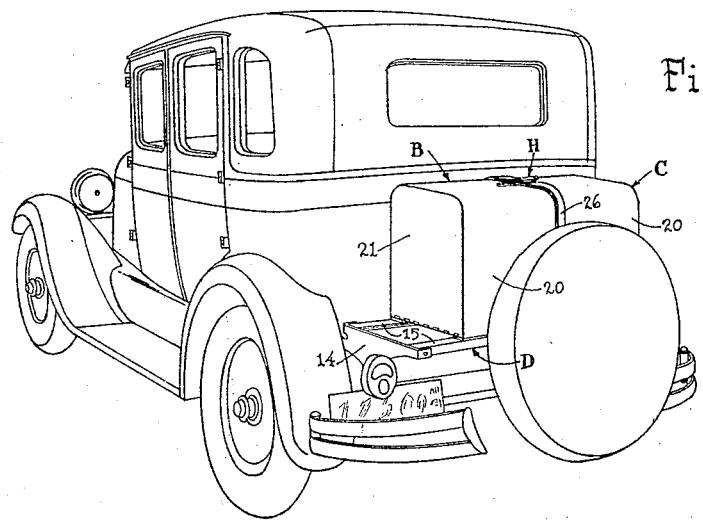
Fig. 12 is a view somewhat similar to that shown in Fig. 11, both wing sections of the device of my invention being closed to form a compact trunk structure.

My trunk structure is convertible to provide, in one form, a compact trunk-like device which is tightly closed to the elements, but at the same time is capable of being opened readily to give access to the interior of the structure. In another form of the convertible structure, had by expanding the trunk-like device, an elongated open carrier is provided. The first form is provided, when the wing sections B, C are folded as best shown in Figs. 1 and 12, while the second form is provided when the wing sections B, C are extended, as best shown in Figs. 3 and 11. These wing sections swing in a direction lengthwise of the trunk structure and of the rack D, but transversely of the automobile. Thus, it may be seen that the expansion of the trunk structure takes place within the minimum lateral limits of the device and between the body of the automobile and the position occupied by the rear spare tire. And it will be understood, therefore, that the weight of the load carried by the device is positioned no farther to the rear of the automobile when the structure is expanded to provide a carrier than it is when the structure is in trunk-like form. Thus, my improvement avoids the objectionable increase of leverage on an automobile structure when expanded and, further, avoids any interference with or from a rear spare tire located in the usual position and carried on the customary rear tire rack.

The body section A consists of a bottom 16 and front and back sides 17, being preferably constructed of sheet metal bent on two lines to form said bottom and side portions. The upper edges of the sides 17 are reinforced with iron straps 18 arranged at the inner margins thereof and suitably secured thereto as by welding or riveting. And said sides are braced by means of U-shaped braces 19 arranged at the ends of the body section and suitably secured as by riveting or welding to the inner margins of the bottom 16 and sides 17. The wing sections B, C are substantially identical, being preferably stamped from sheet metal, each consisting of front and back sides 20, and walls 21 and 22, both serving combined functions, wall 21 forming a bottom portion in the expanded form of the device (Figs. 6 and 8) and an end in the trunk-like form thereof (Figs. 2 and 9), while wall 22 forms an end in the expanded form of the device (Figs. 3, 8 and 9) and a top portion in the trunk-like form thereof (Figs. 9 and 10). Wing sections B, C are suitably hinged to the opposite ends of body section A. In each, hinge loops 23 (Figs. 6 and 8) are formed at the edge of wall 21, the same intermeshing with similar hinge loops 24 formed at the adjacent edge of the bottom 16 of the body section A. Hinge pins 25 passing through these intermeshing loops complete the hinge structures. In this connection, it will be understood, of course, that other types of hinged connections may be employed between said body and wing sections without departing from the spirit of my invention. In folding upon the body section A, the sides of the wing sections B, C pass closely along the outer surfaces of the sides of the body section, wing section C being adapted marginally to overlap the margin of wing section B (Figs. 1 and 10). To improve the appearance of the device, particularly in its normal folded form, the marginal portion of wing section C may be expanded as at 26 giving the folded device the appearance of having a central band and bringing the tops proper of the wing sections in the same plane. At the ends of the body section A, the marginal portions of the sides 17 are shaped to form out-turned hooks 27. The marginal portions of the sides 20 of the wing sections B, C are shaped to form inturned hooks 28, which engage said hooks 27 of the body section A in the extended positions of said wing sections. Thus, the wing sections are effectively braced against any sagging movement as might otherwise occur under the weight of loads placed therein in the extended positions thereof.

Said wing sections B, C are kept from bouncing on their hinges by means of latches E, preferably four in number, one being located at each end of each reinforcing bar 18 of the body section A. Each latch consists of a rod or bolt-like member (Fig. 7) bent to form a head 29 and a stem 30. Each bar 18 is partially cut away at its ends and the contiguous portions of the side 17 notched as at 31, the reduced ends of said bar being looped to form eyes 32 into which a stem 30 of one of the latches E is inserted. Encircling that portion of each stem 30, which depends beneath its respective eye 32 is an expansion spring 33, the same being interposed between said eye and a pin 34 which extends through said stem. In position of disuse, the head 29 of each latch E occupies position along the inner face of its respective bar 18 (dotted lines, Fig. 7), but with its particular wing section extended, the stem may be elevated against the action of the spring 33 and the head turned outwardly over the notch 31 in the side 17 into which it is drawn by the spring 33 when the latch is released. Thus disposed, the head 29 of the latch is closely interposed between an edge of side 17 of the body portion and an edge of side 20 of a wing section, where it forms an abutment for the side of the wing section, preventing the wing section from folding on its hinge.

It is desirable that the sides 20 of the wing sections B, C, when folded, hug the sides 17 of the body section and particularly the sides of wing section B, which is folded first, so that the expanded marginal portion 26 of wing section C will freely overlap the margins of said wing section B. In this connection, I provide two spaced keepers F, G, the former for wing section B and the latter for wing section C. These keepers are identical, each comprising a U-shaped bar, the base 35 of which is secured to the underside of the bottom 16 of body section A. The branches 36 of said keepers, standing alongside the sides 17 of the body section A are turned outward slightly at their upper extremities to catch within their embrace the sides 20 of the wing sections B, C, when they are folded on the body section A to envelop the same. The branches 36 of keeper F catch the sides 20 of wing section B near the corners thereof, opposite the hinge, when said section is in the final stage of its swing into folded position. Said sides, therefore, are caused to hug the sides 17 of the body section A. Likewise, the keeper G draws the corners of the sides 20 of wing section C toward the sides 17 of the body section A, the overlapping of wing section C with wing section B being freely accomplished, yet with a close ultimate relationship between the sides of said sections A, B, and C. The bases 35 of the keepers F, G traverse the trunk rack D and rest upon the rails 15 thereof. To provide a firm footing for the body section A on the rack at either side of the keepers F, G, filler strips 37 of wood or other suitable material are employed. A combined latch and lock H of conventional pattern is supplied to secure the wing sections in folded relation, one member 38 thereof being fastened to the wall 22 of the wing section B and the companion member 39 being fastened to the wall 22 of wing section C. Preferably, the combined latch and lock is of the toggle type, thus affording simple and effective means for drawing the wing sections B, C together and thus securing the same in such relation.

From the foregoing, it will be understood that my improved structure provides a simple, durable and slightly accessory for automobiles, which may be readily converted to different uses. In the form of a trunk, the device houses its contents protecting them against the elements and against access by unauthorized persons. Access to the device in its trunk-like form may be had by extending the wing section C alone, but, of course, if desired, both wing sections may be extended to give access to the contents of the body section. In the extended positions of the wing sections B, C and with the latches E turned into their operative positions, a commodious carrier is provided in which bulky and cumbersome loads may be readily transported. The expansion of the structure to provide a carrier is effected merely by the unfolding or swinging outwardly of the wing sections. In thus shifting said sections, they swing into spaces ordinarily unoccupied, and, in a structure of maximum proportion, may well extend to the outer edges of the rear fenders of the automobile. Since the expansion of the structure is in a direction transversely of the automobile on which it is supported, it is evident that no additional strain, as by increased leverage, is placed upon the automobile structure, the additional load which may be applied to the device in its expanded form being disposed at no greater distance from the back of the car than a load confined within the structure in its folded trunk-like form. In folding and extending the wing sections B, C, the spare tire, if present in the usual location, need not interfere with the operation or be interferred with thereby.

Changes in the specific form of my invention, as herein disclosed, may be made within the scope of what is claimed without departing from the spirit of my invention.

Having described my invention, what I claim as new and desire to protect by Letters Patent is:

1. A combined trunk and luggage carrier constructed to be mounted transversely of an automobile on a support at the rear of the automobile body and convertible from closed trunk-like form into an elongated open top carrier by being expanded endwise at both ends laterally of the automobile and over the rear fenders thereof, said combined structure including an intermediate section carried by said support, and end sections hingedly carried by said intermediate section, said intermediate section comprising front and rear sides and a bottom and being open at its top and ends, the end sections each comprising front and rear sides and two contiguous walls, said end sections being foldable upon said intermediate section, one wall of each end section, in the folded positions of said sections, closing its respective end of the intermediate section and the other wall of each end section cooperating with the corresponding wall of the other end section to close the top of said intermediate section, said end sections, in unfolded positions, providing extensions in opposed endwise continuation of the intermediate section.

2. A combined trunk and luggage carrier for automobiles comprising an intermediate section consisting of sides and a bottom and being open at its ends and top, end sections hingedly pivoted on the intermediate section and adapted to be folded thereon and unfolded therefrom, each end section comprising sides, a bottom-end wall and an end-top wall, said intermediate and end sections, with the latter unfolded, providing an elongated open top carrier having a continuous bottom, side and end wall formation, and, with said end sections folded, providing a relatively compact trunk-like structure, wherein the sides of the end sections overlap the sides of the intermediate section, and the bottom-end wall of each end section closes its respective end of said intermediate section, and the end-top walls of the two end sections overlie opposite portions of the opening at the top of the intermediate section, the sides and end-top wall of each end section being substantially of uniform depth and the distance between the pivots of said end sections being substantially equal to the combined depth of the sides and end-top walls of both end sections, whereby the end-top walls of the folded end sections and the sides of said sections cooperate to envelope the sides of the intermediate section and close the top thereof.

3. A combined trunk and luggage carrier for automobiles comprising an intermediate section consisting of sides and a bottom and being open at its ends and top, end sections hingedly pivoted on the intermediate section and adapted to be folded thereon and unfolded therefrom, each end section comprising sides, a bottom-end wall and an end-top wall, said intermediate and end sections, with the latter unfolded, providing an elongated open top carrier having a continuous bottom, side and end wall formation, and, with said end sections folded, providing a relatively compact trunk-like structure, wherein the sides of the end sections telescope the sides of the intermediate section, and the bottom-end walls of the end sections close the opposite ends of said intermediate section, and the end-top walls of the wing sections overlie opposite portions of the opening at the top of the intermediate section, the distance between the pivots of said end sections being substantially equal to the combined depth of the end-top walls of both end sections, whereby said walls in the folded positions of the end sections cooperate to close the top of the intermediate section.

4. A combined trunk and luggage carrier of the character described capable of being expanded endwise and thus converted from compact closed trunk-like form into that of an elongated open top carrier free from internal obstructions from end to end thereof, said structure comprising an intermediate section consisting of two sides and a bottom and being open at its ends and top and further comprising end sections hinged to the lower end portions of said intermediate section and foldable on said intermediate section, each end section consisting of two sides and two contiguous walls, said end sections, in folded position, individually closing their respective ends of the intermediate section and conjointly closing the top of said intermediate section, said end sections in unfolded position, forming opposed endwise extensions of the bottom and sides of the intermediate section and providing ends for the extended structure.

5. A combined trunk and luggage carrier constructed to be supported extending crosswise of an automobile at the rear of the body thereof and capable of being expanded in a direction transversely of the supporting automobile and thus converted from compact closed trunk-like form into that of an elongated open top carrier, said structure comprising an intermediate section open at its ends and top and further comprising end sections hinged to said intermediate section and foldable together thereon, said end sections, in folded position, closing the ends and top of the intermediate section and, in unfolded position, providing opposed endwise extensions in continuation of the intermediate section.

6. A combined trunk and luggage carrier of the character described capable of being expanded endwise and thus converted from compact closed trunk-like form into that of an elongated open top carrier free from internal obstructions from end to end thereof, said structure comprising an intermediate section consisting of front and rear sides and a bottom and being open at its ends and top and further comprising end sections hinged to the lower end portions of said intermediate section and foldable on said intermediate section, each end section consisting of front and rear sides and two contiguous walls, said end sections, in folded position, individually closing their respective ends of the intermediate section and closing the top of said intermediate section conjointly in marginally overlapping relation, said end sections, in unfolded position, forming opposed endwise extensions of the bottom and sides of the intermediate section and providing ends for the extended structure, two limit stops at each side of the intermediate section, one for each of the corresponding sides of the end sections, and cooperating clamping devices mounted on the overlapping walls of said end sections for holding said sections in folded position and bringing the sides thereof into cooperation with their respective limit stops.

7. A combined trunk and luggage carrier of the character described capable of being expanded endwise and thus converted from compact closed trunk-like form into that of an elongated open top carrier free from internal obstructions from end to end thereof, said structure comprising an intermediate section consisting of front and rear sides and a bottom and being open at its ends and top and further comprising end sections hinged to the lower end portions of said intermediate section and foldable on said intermediate section, each end section consisting of front and rear sides and two contiguous walls, said end sections, in folded position, individually closing their respective ends of the intermediate section and conjointly closing the top of said intermediate section, said end sections, in unfolded position, forming opposed endwise extensions of the bottom and sides of the intermediate section and providing ends for the extended structure, and limit stop means on the intermediate section for the end sections, said means cooperating with said end sections to arrest swinging movements thereof with respect to said intermediate section.

8. A combined trunk and luggage carrier of the character described capable of being expanded endwise and thus converted from compact closed trunk-line form into that of an elongated open top carrier free from internal obstructions from end to end thereof, said structure comprising an intermediate section consisting of front and rear sides and a bottom and being open at its ends and top and further comprising end sections hinged to the lower end portions of said intermediate section and foldable on said intermediate section, each end section consisting of front and rear sides and two contiguous walls, said end sections, in folded position, individually closing their respective ends of the intermediate section and conjointly closing the top of said intermediate section, said end sections, in unfolded position, forming opposed endwise extensions of the bottom and sides of the intermediate section and providing ends for the extended structure, guiding means associated with the intermediate section for guiding each side of each end section individually with respect to the corresponding side of said intermediate section as the end sections are folded on said intermediate section.

9. In an extension trunk, a fixed trunk member including forward and rear side walls and a bottom wall, said fixed trunk member being adapted to be secured to a vehicle in a position therebehind with its ends open and directed laterally, and a pair of movable trunk members hinged to the fixed movable trunk member, each of said movable trunk member being adapted to swing in a lateral direction relative to the vehicle, from an upstanding position forming an end wall in the open end of the fixed trunk member, to a position extending away from said open end, forming, together with the fixed trunk member, a receptacle of greater length in a direction laterally of the vehicle than the length of the fixed trunk member.

In testimony whereof I have affixed my signature to this specification.

JOHN W. MALMQUIST.